Patented Mar. 4, 1924.

1,485,814

UNITED STATES PATENT OFFICE.

EMIL REBER, OF BASEL, SWITZERLAND, ASSIGNOR TO SOCIETY OF CHEMICAL INDUSTRY IN BASLE, OF BASEL, SWITZERLAND.

DYESTUFFS CAPABLE OF BEING CHROMED AND PROCESS OF MAKING SAME.

No Drawing.    Application filed February 5, 1923.  Serial No. 617,174.

*To all whom it may concern:*

Be it known that I, EMIL REBER, a citizen of the Swiss Republic, and resident of Basel, Switzerland, have invented new and useful Dyestuffs Capable of Being Chromed and Processes of Making Same, of which the following is a full, clear, and exact specification.

I have found that new mordant dyeing dyestuffs can be obtained which can be chromed on animal fiber by coupling, in presence of calcium hydroxide, 1-amino-5-oxynaphthalene-7-sulfonic acid with the diazo-compounds derived from 2-amino-1-phenol containing one nitro group in another position than 3 and 5. The dyestuffs thus obtained, which correspond with the general formula:

$$R-N=N-R'$$

wherein R designates a 2-amino-1-phenol radical containing one nitro group in another position than 3 and 5, and R' the radical of the 1-amino-5-oxynaphthalene-7-sulfonic acid, constitute deep blackish powders dissolving in water to violet blue to blue solutions, and in sulfuric acid to violet red to bluish red colorations. They dye wool in an acid bath brown-violet to blue tints which become more or less greenish to bluish deep black when subsequently chromed, the dyeings being very fast to light, fulling and potting.

The invention is illustrated by the following example:

24 parts of 1-amino-5-oxynaphthalene-7-sulfonic acid are dissolved with heating in 150 parts of water containing 10 parts of calcium hydroxide; the solution at 0°–5° C. is mixed with an aqueous suspension, made slightly acid to congo, of the diazo-compound from 15.5 parts of 4-nitro-2-amino-phenol, 15 parts of hydrochloric acid and 7 parts of sodium nitrite dissolved in 300 parts of water. The coupling occurs at once and is completed in about 20 minutes with formation of a brownish-black magma of dyestuff.

The dyestuff may be isolated by acidifying and filtering or by neutralizing the small quantity of free lime by heating with sodium carbonate, then filtering from calcium carbonate and salting out the dyestuff from the filtrate by means of common salt. The dyestuff is obtained by this last method of a blackish colour when dry. It dissolves in water to a violet blue solution and dyes wool in an acid bath brown-violet which becomes greenish deep black when subsequently chromed.

In the following table the dyeing properties of the series of dyestuffs obtainable in accordance with this invention are given:

| Diazo-component. | Appearance of the dyestuff. | Coloration of the solution in $H_2O$. | Coloration of the solution in $SO_4H_2$. | Tints on wool. | |
|---|---|---|---|---|---|
| | | | | Direct dyeing. | Dyeing subsequently chromed. |
| 4-nitro-2-amino-phenol. | Blackish powders. | Violet blue. | Bluish red. | Violet brown. | Greenish deep black. |
| 4-nitro-6-chloro-2-aminophenol. | " | " | Violet red. | Dark blue. | " |
| 6-nitro-4-chloro-2-aminophenol. | " | Blue... | Bluish red. | " | Bluish deep black. |
| 6-nitro-4-methyl-2-aminophenol. | " | " | " | Reddish blue. | Bluish black. |
| 4-nitro-6-methyl-2-aminophenol. | " | " | " | Violet brown. | Deep black. |

What I claim is:

1. The herein described new process for the manufacture of new mordant dyeing dyestuffs resulting from coupling, in the presence of calcium hydroxide, of 1-amino-5-oxynaphthalene-7-sulfonic acid with the diazo-compounds derived from 2-amino-1-phenol containing one nitro group in another position than in 3 and 5.

2. The herein described new process for the manufacture of new mordant dyeing dyestuffs resulting from coupling, in the presence of calcium hydroxide, of 1-amino-5-oxynaphthalene-7-sulfonic acid with the diazo-compounds derived from 2-amino-1-phenol containing one nitro group in position 4.

3. The herein described new dyestuffs resulting from coupling, in the presence of calcium hydroxide, of 1-amino-5-oxynaphthalene-7-sulfonic acid with the diazo-compounds derived from 2-amino-1-phenol containing one nitro group in another position than in 3 and 5, corresponding with the general formula $R-N=N-R'$, wherein R signifies a 2-amino-1-phenol radical containing one nitro group in another position than in 3 and 5, and R' a 1-amino-5-oxynaphthalene-7-sulfonic acid radical, which constitute blackish powders dissolving in water with violet blue to blue colorations, and in sulfuric acid with violet red to bluish red colorations and dye wool violet brown to dark blue tints which become more or less greenish to bluish deep black when subsequently chromed.

4. The herein described new dyestuffs resulting from coupling, in the presence of calcium hydroxide, of 1-amino-5-oxynaphthalene-7-sulfonic acid with the diazo-compounds derived from 2-amino-1-phenol containing one nitro group in position 4, corresponding with the general formula R—N=N—R', wherein R signifies a 2-amino-1-phenol radical containing one nitro group in position 4, and R' a 1-amino-5-oxynaphthalene-7-sulfonic acid radical, which constitute blackish powders dissolving in water with violet blue to blue colorations, and in sulfuric acid with violet red to bluish red colorations and dye wool violet brown to dark blue tints which become more or less greenish to bluish deep black when subsequently chromed.

In witness whereof I have hereunto signed my name this 23rd day of January, 1923, in the presence of two subscribing witnesses.

EMIL REBER.

Witnesses:
 AMAND BRAUN,
 JULIA DURST.